US006962173B1

(12) United States Patent
Fishgrab

(10) Patent No.: US 6,962,173 B1
(45) Date of Patent: Nov. 8, 2005

(54) WIRE HANDLING TOOL ELEMENT AND METHOD OF USE THEREOF

(76) Inventor: Dewane K. Fishgrab, 8617 W. Avalon Dr., Phoenix, AZ (US) 85037

( * ) Notice: Subject to any disclaimer, the term of this patent is extended or adjusted under 35 U.S.C. 154(b) by 375 days.

(21) Appl. No.: 10/407,663

(22) Filed: Apr. 7, 2003

(51) Int. Cl.$^7$ .................................................. B21F 7/00
(52) U.S. Cl. ....................................... 140/118; 140/123
(58) Field of Search ......................... 140/117, 118, 119, 140/123, 123.5, 123.6, 149

(56) References Cited

U.S. PATENT DOCUMENTS

| | | | | |
|---|---|---|---|---|
| 1,113,372 | A | * | 10/1914 | Porter .......................... 140/123 |
| 1,436,637 | A | * | 11/1922 | Bates ........................... 140/119 |
| 1,855,960 | A | * | 4/1932 | Hansen ......................... 140/117 |
| 2,475,525 | A | * | 7/1949 | Shields ...................... 140/123.5 |
| 3,639,965 | A | | 2/1972 | Chu |
| 3,742,574 | A | | 7/1973 | Bennett et al. |
| 3,748,952 | A | | 7/1973 | Petzetakis |
| 4,207,927 | A | | 6/1980 | Camardella |
| 4,776,094 | A | | 10/1988 | Glesser |
| 5,345,681 | A | | 9/1994 | Undin |
| 5,435,029 | A | | 7/1995 | Carlson, Jr. et al. |

* cited by examiner

Primary Examiner—Lowell A. Larson
(74) Attorney, Agent, or Firm—Donald R. Schoonover

(57) ABSTRACT

A wire handling tool element includes a cylindrical body having a J-shaped hook on one end and a drill bit-type element on a second end. A wire is pulled out of a jacket containing a plurality of wires by attaching one end of that wire to the cylindrical body and attaching the cylindrical body to a power tool, such as a power drill, and causing the wire to be wrapped around the cylindrical body. This wrapping pulls the wire out of the jacket. Once the wire is pulled out of the jacket, one end of the wire is attached to the J-shaped hook and the other end of the wire is held against rotation and the power tool is operated thereby twisting the wire about its longitudinal axis. A plurality of wires can be attached to the J-shaped hook to be twisted together when the power tool is operated.

4 Claims, 2 Drawing Sheets

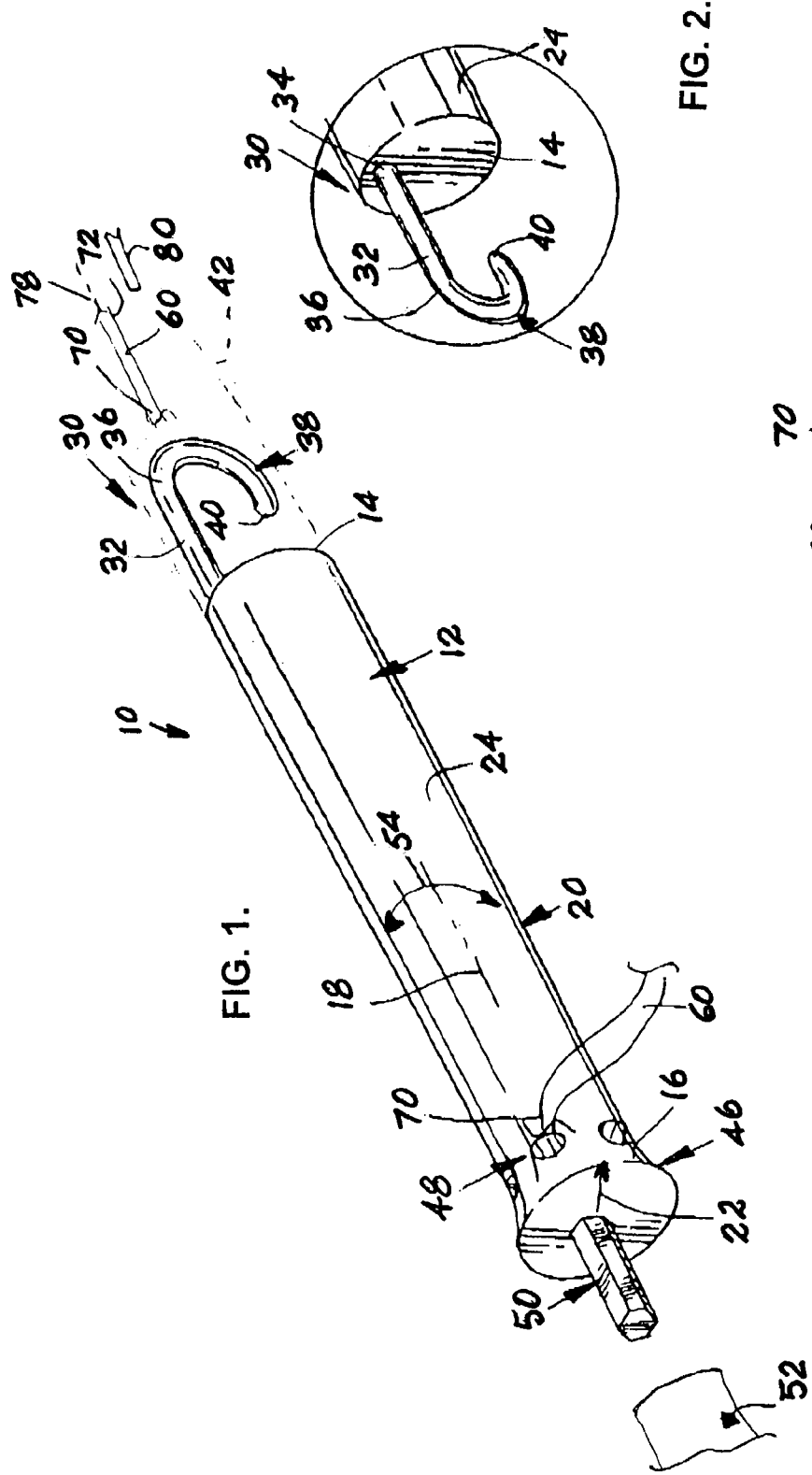
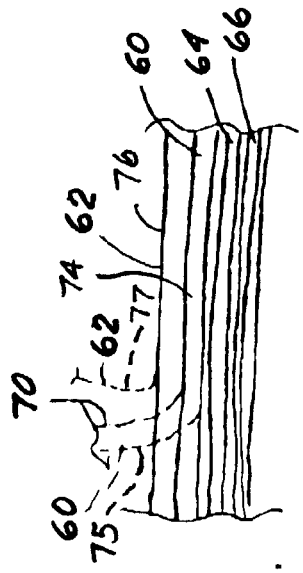

WIRE HANDLING TOOL ELEMENT AND METHOD OF USE THEREOF

BACKGROUND OF THE INVENTION

1. Field of the Invention

The present invention relates to the general art of tools, and to the particular field of hand tools.

2. Discussion of the Related Art

Many electrical jobs require removal of one wire from a jacket which contains a plurality of wires. This is often the case when a neutral wire must be removed from a jacket.

Heretofore, a neutral wire has been removed from the jacket by manually pulling the neutral wire out of the jacket then separating the conductor from the jacket. If a plurality of neutral wires are to be twisted together, this twisting operation is generally performed manually. This is a time consuming and awkward procedure. The procedure may also require several men to complete, which exacerbates the problems associated with the time consuming nature of the present procedure.

Therefore, there is a need for a tool for handling wires which will expedite the removal of one wire from a jacket containing a plurality of wires.

Still further, there is a need for a tool for handling wires which will expedite the removal of one wire from a jacket containing a plurality of wires which can also expedite the twisting together of a plurality of wires.

PRINCIPAL OBJECTS OF THE INVENTION

It is a main object of the present invention to provide a tool for handling wires which will expedite the removal of one wire from a jacket containing a plurality of wires.

It is another object of the present invention to provide a tool for handling wires which will expedite the removal of one wire from a jacket containing a plurality of wires and which can also expedite the twisting together of a plurality of wires.

SUMMARY OF THE INVENTION

These, and other, objects are achieved by a wire handling tool element which is attached to the end of one wire of a plurality of wires contained in a jacket. The tool element is attached to a power drill in the manner of a drill bit and the power drill is activated which rotates the tool element about a longitudinal centerline of the tool element. As the tool element rotates, the wire wraps around the tool element and is pulled out of the jacket by operation of the power drill rather than manually. The tool element further includes a J-shaped hook on one end thereof. Once the wire is removed and separated from the jacket, it can be twisted together with other wires by attaching the wire and/or wires to the J-shaped hook, holding one end of each of the wires and operating the drill. The wires attached to the hook will be twisted together as the J-shaped hook rotates under the influence of the power drill.

A wire can thus be removed from a jacket using a drill rather than manual power and the wire can be quickly twisted together with other wires using drill power rather than manual power. The removal process is thus expeditious and the twisting process is also expeditious. It may be possible for both processes to be carried out by one man thus saving man power.

BRIEF DESCRIPTION OF THE DRAWING FIGURES

FIG. 1 is a perspective view of the wire handling tool element embodying the present invention in combination with a wire to be twisted and a power tool, such as a power drill, that operates the tool.

FIG. 2 is a perspective view of one end of the wire handling tool element of the present invention.

FIG. 3 shows a portion of a jacketed wire bundle with one wire of the bundle being pulled out of the jacket and the jacket pulled back to expose the wire to be pulled away from the other wires in the bundle.

DETAILED DESCRIPTION OF THE PREFERRED EMBODIMENT

Figure 4:
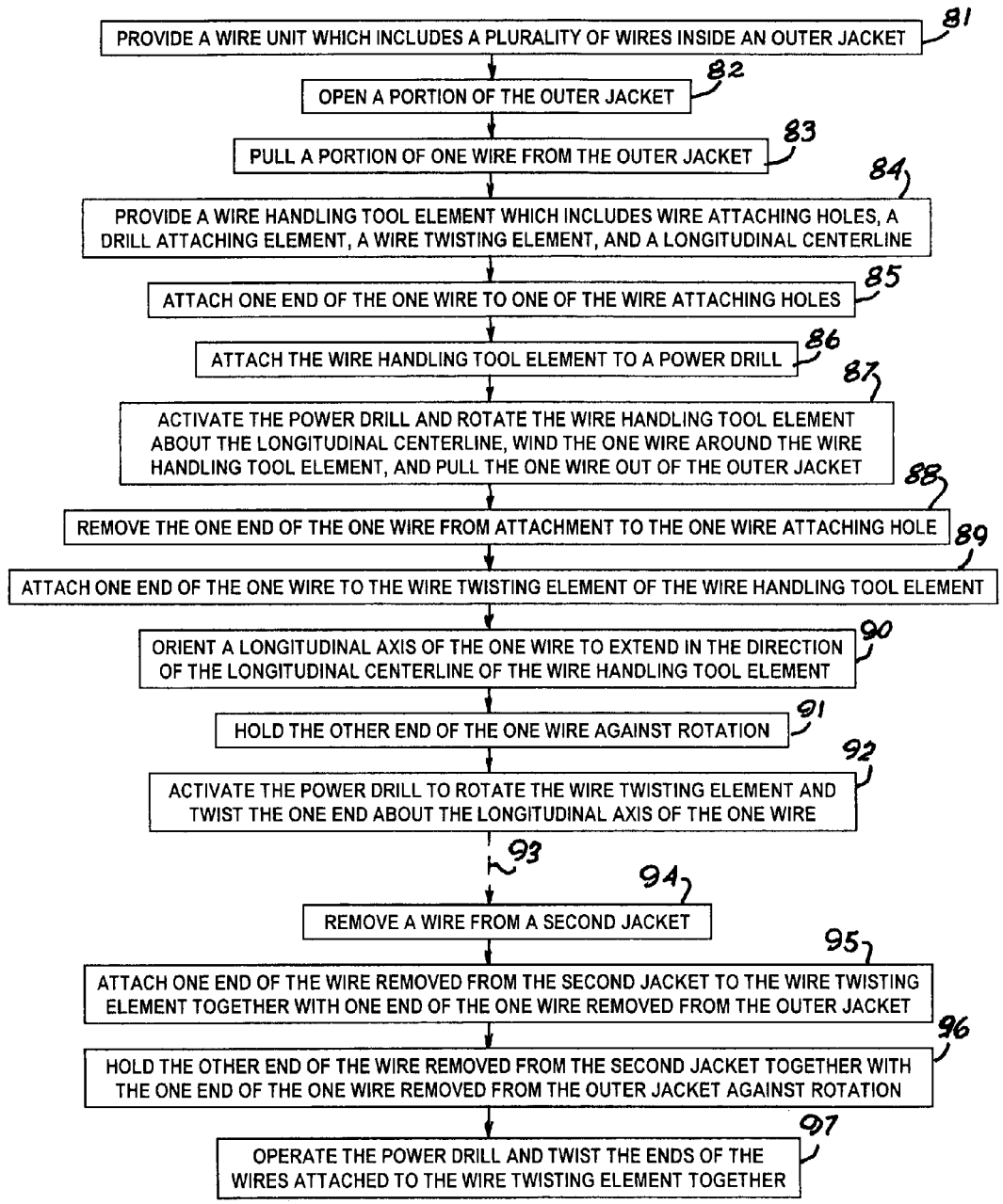
FIG. 4 is a schematic representation of a method of applying the present invention.

Other objects, features and advantages of the invention will become apparent from a consideration of the following detailed description and the accompanying drawings.

Referring to the figures, it can be understood that the present invention is embodied in a wire handling tool element 10 that is used to remove a wire from a jacket and then twist that wire about the longitudinal centerline of that wire after the wire has been separated from the jacket. Wire handling tool element 10 comprises a body 12 having a first end 14, a second end 16, and a longitudinal center line 18 extending between the first end 14 and the second end 16. A cylindrical wall 20 connects the first end 14 to the second end 16 and has a radial dimension 22 and a cylindrical outer circumference 24.

A J-shaped hook 30 is located on the first end 14 of the body 12 and includes a linear portion 32 which has a proximal end 34 fixed to the first 14 end of the body 12 and a distal end 36 spaced apart from the first end 14 of the body 12. Linear portion 32 of the J-shaped hook 30 extends away from the first end 14 of the body 12 in the direction of the longitudinal centerline 18 of the body 12. The J-shaped hook 30 further includes a curved portion 38 on the distal end 36 of the linear portion 32 of the J-shaped hook 30. The curved portion 38 has a distal end 40 that is spaced apart from the first end 14 of the body 12 and is located within an area 42 defined by a projection of the outer cylindrical circumference 24 of the body 12. In the form shown, the tool element 10 has the J-shaped hook offset, or spaced apart from, the longitudinal centerline 18 of the body 12. A flange 46 is located on the second end 16 of the body 12.

A plurality of holes, such as hole 48, are defined through the cylindrical outer circumference 24 of the body 12. The holes 48 of the plurality of holes are spaced apart from each other around the cylindrical outer circumference 24 of the body 12 and extend in the direction of the radial dimension 22 of the body 12.

A drill engaging shank 50 is attached to flange 46 and extends in the direction of the longitudinal centerline 18 of the body 12 away from the flange 46.

A power drill is represented by reference number 52 and is attached to the shank 50 in the manner of a drill bit. Operation of the power drill 52 will thus rotate shank 50 about the longitudinal centerline 18 of body 12 thereby rotating body 12 in direction 54 about the longitudinal centerline of the body. A wire 60 is partially removed from an outer jacket 62 which contains a plurality of wires, such as wire 60 which can be a neutral wire, as well as additional wires 64 and 66. One end 70 of wire 60 is engaged with hole 48 of the plurality of holes and the power drill 52 is activated. The removal of a wire from the jacket 62 is indicated in FIG. 3 with a wire being shown in solid lines 74 inside the jacket 62 and then shown in dotted lines 77 after it has been partially removed from the jacket 62. The closed jacket 62 is shown in solid lines 76 in FIG. 3 and then the partially opened jacket 62 is shown in dotted lines 77 in FIG. 3. The jacket 62 will be fully opened during the winding operation as the wire 60 is pulled out of the jacket 62 by operation of the power tool 52. The opening of the jacket 62 thus need not be carried out manually. The rotation of the body 12 about the longitudinal centerline 18 wraps the wire 60 around the outer circumference 24 of the tool element 10 and pulls the wire 60 out of the jacket 62. The jacket 62 can be held during the operation of the power tool 52 so the wire 60 is moved with respect to the jacket 62 to be pulled out of the jacket 62.

Once the wire 60 is pulled out of the jacket 62 and separated from the jacket 62, it can be removed from the tool 10 and is indicated in FIG. 1 as removed wire 60. One end 70 of the removed wire 60 is attached to the J-shaped hook 30 and the other end 72 is held against rotation. The power tool 52 is again activated to rotate the J-shaped hook 30 around the longitudinal centerline 18 of the body 12. This rotation will twist the wire 60 around the longitudinal centerline 78 of the wire 60. If additional wire, such as wire 76, are also attached to the J-shaped hook 30 in the manner just discussed, and if the other ends of those wires are also held against rotation and/or against the other end of wire 70, the wires will be twisted together during rotation of the J-shaped hook 30 under the influence of the power drill 52.

The method of using the wire handling tool element 10 of the present invention thus comprises providing a wire unit which includes a plurality of wires inside an outer jacket, step 81; opening a portion of the outer jacket, step 82; pulling a portion of one wire from the outer jacket, step 83; providing a wire handling tool element which includes wire attaching holes, a drill attaching element, a wire twisting element, and a longitudinal centerline, step 84; attaching one end of the one wire to one of the wire attaching holes of the wire handling tool element, step 85; attaching the wire handling tool element to a power drill, step 86; activating the power drill and rotating the wire handling tool element about the longitudinal centerline thereof using the power drill, winding the one wire around the wire handling tool element, and pulling the one wire out of the outer jacket, step 87; after the one wire is pulled out of the outer jacket, removing the one end of the one wire from attachment to the one hole of the plurality of holes, step 88; attaching one end of the one wire to the wire twisting element of the wire handling tool element, step 89; orienting the one wire to have a longitudinal axis thereof extend in the direction of the longitudinal centerline of the wire handling tool element, step 90; holding one end of the one wire against rotation, step 91; and activating the power tool to rotate the wire twisting element and twisting the one wire about a longitudinal axis of the one wire, step 92. If additional wires are to be twisted together with or braided to the one wire as indicated by reference numeral 93 in FIG. 4, the method will further include removing a wire from a second jacket, step 94; attaching the wire removed from the second jacket to the wire twisting element together with the one wire removed from the outer jacket, step 95; holding one end of the wire removed from the second jacket together with the one end of the wire removed from the outer jacket against rotation, step 96; and operating the power drill and twisting the wires together during operation of the power drill, step 97.

As will be understood from the teaching of this disclosure, the power required to remove a wire from a jacket is supplied by a power drill rather than manually. This will make such removal faster and easier than if such removal had to be carried out manually. Furthermore, as will also be understood from the teaching of this disclosure, the twisting or braiding of wires is carried out using the power supplied by a power drill rather than manually. Again, time and effort will be saved because power is supplied by a power tool rather than manually.

It is understood that while certain forms of the present invention have been illustrated and described herein, it is not to be limited to the specific forms or arrangements of parts described and shown.

What is claimed and desired to be covered by Letters Patent is:

1. A wire handling tool element comprising:
   a) a body having a first end, a second end, a longitudinal centerline extending between the first end and the second end, and a cylindrical wall connecting the first end to the second end, the cylindrical wall having a radial dimension and a cylindrical outer circumference;
   b) a J-shaped hook on the first end of said body, said J-shaped hook including a linear portion having a proximal end fixed to the first end of said body and a distal end spaced apart from the first end of said body, the linear portion of said J-shaped hook extending away from the first end of said body in the direction of the longitudinal centerline of said body, said J-shaped hook further including a curved portion on the distal end of the linear portion of said J-shaped hook, the curved portion having a distal end that is spaced apart from the first end of said body and is located within an area defined by a projection of the outer cylindrical circumference of said body;
   c) a flange on the second end of said body;
   d) a plurality of holes defined through the cylindrical outer circumference of said body, the holes of said plurality of holes being spaced apart from each other around the cylindrical outer circumference of said body and extend in the direction of the radial dimension of said body; and
   e) a drill engaging shank attached to said flange and extending in the direction of the longitudinal centerline of said body away from said flange.

2. The wire handling tool element as described in claim 1 wherein the linear portion of said J-shaped hook is spaced apart from the longitudinal centerline of said body.

3. A method of handling wire comprising
   a) providing a wire unit which includes a plurality of wires inside an outer jacket;
   b) opening the outer jacket;
   c) pulling a portion of one wire from the outer jacket;
   d) providing a wire handling tool element which includes wire attaching holes, a drill attaching element; a wire twisting element and a longitudinal centerline;
   e) attaching one end of the one wire to one of the wire attaching holes of the wire handling tool element;
   f) attaching the wire handling tool element to a power drill;
   g) activating the power drill and rotating the wire handling tool element about the longitudinal centerline thereof using the power drill;
   h) winding the one wire around the wire handling tool element and pulling the one wire out of the outer jacket;
   I) after the one wire is pulled out of the outer jacket, removing the one end of the wire from attachment to the one hole of the plurality of holes and attaching the one wire to the wire twisting element of the wire handling tool element;

j) orienting the one wire to have a longitudinal axis thereof extend in the direction of the longitudinal centerline of the wire handling tool element;

k) holding one end of the one wire against rotation and activating the power tool to rotate the wire twisting element and twisting the one wire about a longitudinal axis of the one wire.

4. The method as described in claim 3 further including steps of removing a wire from a second jacket; attaching the wire removed from the second jacket to the wire twisting element together with the one wire removed from the outer jacket; holding one end of the wire removed from the second jacket together with the one end of the wire removed from the outer jacket against rotation; operating the power drill; and twisting the wires together during operation of the power drill.

* * * * *